United States Patent
Szarvasy

(10) Patent No.: US 11,073,035 B2
(45) Date of Patent: Jul. 27, 2021

(54) LABYRINTH SEALING SYSTEM AND GAS TURBINE ENGINE WITH A LABYRINTH SEALING SYSTEM

(71) Applicant: ROLLS-ROYCE DEUTSCHLAND LTD & CO KG, Blankenfelde-Mahlow (DE)

(72) Inventor: Ivo Szarvasy, Stahnsdorf (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 98 days.

(21) Appl. No.: 16/513,048

(22) Filed: Jul. 16, 2019

(65) Prior Publication Data

US 2020/0049024 A1    Feb. 13, 2020

(30) Foreign Application Priority Data

Aug. 9, 2018    (DE) ...................... 10 2018 119 463.3

(51) Int. Cl.
| | | |
|---|---|---|
| *F01D 11/02* | (2006.01) | |
| *F02C 3/107* | (2006.01) | |
| *F02C 7/28* | (2006.01) | |

(52) U.S. Cl.
CPC .............. *F01D 11/02* (2013.01); *F02C 3/107* (2013.01); *F02C 7/28* (2013.01); *F05D 2220/323* (2013.01); *F05D 2240/55* (2013.01)

(58) Field of Classification Search
CPC ........ F01D 11/001; F01D 11/02; F01D 11/08; F01D 11/12; F01D 11/025; F16J 15/447
See application file for complete search history.

(56) References Cited

U.S. PATENT DOCUMENTS

| | | | |
|---|---|---|---|
| 2009/0058013 A1* | 3/2009 | Bulgrin ................. | F01D 11/001 277/419 |
| 2017/0114655 A1 | 4/2017 | Kim | |
| 2017/0356309 A1* | 12/2017 | Davis ........................ | F01D 5/02 |
| 2018/0209290 A1* | 7/2018 | Port ....................... | F04D 29/164 |

FOREIGN PATENT DOCUMENTS

EP        2055899 A2        5/2009

OTHER PUBLICATIONS

German Search Report dated Jun. 12, 2019 for counterpart German Patent Application No. DE 10 2018 119 463.3.

* cited by examiner

*Primary Examiner* — J. Todd Newton
*Assistant Examiner* — Cameron A Corday
(74) *Attorney, Agent, or Firm* — Shuttleworth & Ingersoll, PLC; Timothy Klima

(57) ABSTRACT

A labyrinth seal system having at least two sealing fins arranged axially one behind the other on a rotor of a turbomachine and having a radially facing run-in element for the at least two sealing fins on a stator of the turbomachine, wherein in each case one radial sealing gap exists between the run-in element and the at least two sealing fins, wherein maxima of the radial sealing gaps are arranged offset with respect to one another in a circumferential direction, such that, in the region of the maxima, a passage exists in targeted fashion, for an air flow to the sealing fins that follow downstream, in the event of rubbing against the stator. This may be applied for example in a gas turbine engine.

18 Claims, 6 Drawing Sheets

LABYRINTH SEALING SYSTEM AND GAS TURBINE ENGINE WITH A LABYRINTH SEALING SYSTEM

This application claims priority to German Patent Application DE102018119463.3 filed Aug. 9, 2018, the entirety of which is incorporated by reference herein.

DESCRIPTION

The present disclosure relates to a labyrinth seal system and to a gas turbine engine having features as disclosed herein.

In turbomachines, such as for example gas turbine engines for aircraft, an energy exchange takes place between a continuously flowing fluid and a continuously rotating blade system, wherein the exchanged energy is based on flow-based forces. Here, the energy can be transferred from the flow to rotatable machine parts or vice versa.

Here, it is often necessary to fluidically seal off rotating components with respect to static components. Such a system is known for example from EP 2 055 899 A2. Labyrinth seal systems are fundamentally known from said document. A characteristic of labyrinth seals is the targeted lengthening of the flow path for the fluid flow that is to be sealed off through the gap that is to be sealed off, whereby the flow resistance is greatly increased. The path lengthening is generally realized by means of an interengagement of sealing lips or fins and a run-in element on the rotor and the stator. In turbomachines, specifically in gas turbine engines of aircraft, high thermal loads are attained.

There is the demand to create labyrinth seal systems which are also highly capable of withstanding thermal loads.

According to a first aspect, a labyrinth seal system is provided which has at least two sealing fins arranged axially one behind the other on a rotor of a turbomachine. Arranged in a radially facing manner is a run-in element on a stator for the at least two sealing fins of the turbomachine, wherein in each case one radial sealing gap is present between the run-in element and the at least two sealing fins. Here, maxima of the radial sealing gaps are arranged offset in targeted fashion with respect to one another in a circumferential direction, such that, in the region of the maxima, a passage is formed in targeted fashion, for an air flow to the sealing fins that follow downstream, in the event of rubbing against the stator.

By means of the targeted variation of the sealing gap heights along the circumferential direction, it can be achieved that an air flow flows in targeted fashion along the labyrinth seal, which air flow permits convective cooling.

This targeted variation of the sealing gap heights can be achieved in a variety of ways. In one embodiment, the minima of the radial extent of the at least two sealing fins are arranged offset with respect to one another in a circumferential direction. It is thus for example possible for the maxima of the radial sealing gaps to be generated by means of an eccentric offset of the sealing fins around the rotor. The minima of the radial extent of the sealing fins correspond to the maxima of the sealing gap heights.

Alternatively or in addition, the minima of the radial extent of the run-in element may be arranged offset with respect to one another in a circumferential direction. Run-in regions for the at least two sealing fins in the run-in element are arranged so as to be eccentrically radially offset with respect to one another in the stator.

In one embodiment, the maxima of the sealing gaps may be offset in a circumferential direction in each case by an angle of $$360°/\text{number of the sealing fins}(51,52,53),$$

such that the maxima are arranged rotationally symmetrically.

It is basically possible for the at least two sealing fins to be oriented radially outward from the rotor and/or radially inward.

In a further embodiment, two to four sealing fins are arranged axially one behind the other. It is also possible for the circumferential contour of the at least two sealing fins to be circular.

The eccentricity of the at least two sealing fins may amount to between 0.01 and 1 mm, in particular between 0.05 and 0.15 mm, very particularly 0.1 mm. In particular, the eccentricity may amount to 0.1 mm for every 200 mm diameter of the rotor.

A further alternative for creating passages for air at sealing fins can be achieved by virtue of the at least two sealing fins having recesses offset on the circumference, such that maxima of the radial sealing gaps in a circumferential direction are generated and, in the region of the recesses, a passage exists in targeted fashion, for an air flow to the sealing fins that follow downstream, in the event of rubbing against the stator.

In particular, a gas turbine engine for an aircraft is highly capable of withstanding thermal loads, having a core engine comprising a turbine, a compressor, and a core shaft connecting the turbine to the compressor;

a fan which is positioned upstream of the core engine, wherein the fan comprises a plurality of fan blades;

a transmission, which can be driven by the core shaft, wherein the fan can be driven by means of the transmission (30) at a lower rotational speed than the core shaft (26), having a labyrinth seal system according to the present disclosure.

As noted elsewhere herein, the present disclosure may relate to a gas turbine engine, e.g. an aircraft engine. Such a gas turbine engine may comprise a core engine comprising a turbine, a combustor, a compressor, and a core shaft connecting the turbine to the compressor. Such a gas turbine engine may comprise a fan (with fan blades) which is positioned upstream of the core engine.

Arrangements of the present disclosure may be particularly, although not exclusively, beneficial for geared fans, which are driven via a transmission. Accordingly, the gas turbine engine may comprise a transmission which is driven via the core shaft and the output of which drives the fan in such a way that it has a lower rotational speed than the core shaft. The input to the transmission may be effected directly from the core shaft, or indirectly via the core shaft, for example via a spur shaft and/or spur gear. The core shaft may be rigidly connected to the turbine and the compressor, such that the turbine and compressor rotate at the same rotational speed (with the fan rotating at a lower rotational speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may further comprise a second turbine, a second compressor, and a second core shaft connecting the second turbine to the second compressor. The second turbine, second compressor, and second core shaft may be arranged to rotate at a higher speed than the first core shaft.

In such an arrangement, the second compressor may be positioned axially downstream of the first compressor. The second compressor may be arranged to receive (for example directly receive, for example via a generally annular duct) a flow from the first compressor.

The transmission may be designed to be driven by the core shaft that is configured to rotate (for example in use) at the lowest rotational speed (for example the first core shaft in the example above). For example, the transmission may be designed to be driven only by the core shaft that is configured to rotate (for example in use) at the lowest rotational speed (for example only by the first core shaft and not the second core shaft, in the example above). Alternatively, the transmission may be designed to be driven by one or more shafts, for example the first and/or second shaft in the example above.

In a gas turbine engine as described and/or claimed herein, a combustor may be provided axially downstream of the fan and compressor (or compressors). For example, the combustor may be directly downstream of (for example at the exit of) the second compressor, when a second compressor is provided. By way of a further example, the flow at the exit of the compressor may be supplied to the inlet of the second turbine, when a second turbine is provided. The combustor may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (i.e. the angle of incidence may be variable). The row of rotor blades and the row of stator blades may be axially offset with respect to each other.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset with respect to each other.

Each fan blade may have a radial span extending from a root (or a hub) at a radially inner location which is flowed over by gas, or from a 0% span position, to a tip with a 100% span position. The ratio of the radius of the fan blade at the hub to the radius of the fan blade at the tip may be less than (or of the order of magnitude of) any of the following: 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range bounded by two values in the previous sentence (i.e. the values may form upper or lower bounds). These ratios can commonly be referred to as the hub-to-tip ratio. The radius at the hub and the radius at the tip may both be measured at the leading edge (or the axially forwardmost edge) of the blade. The hub-to-tip ratio refers, of course, to that portion of the fan blade which is flowed over by gas, i.e. the portion radially outside any platform.

The radius of the fan may be measured between the engine centerline and the tip of the fan blade at its leading edge. The diameter of the fan (which can generally be double the radius of the fan) can be larger than (or of the order of magnitude of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range bounded by any two of the values in the previous sentence (i.e. the values may form upper or lower bounds).

The speed of the fan may vary in operation. Generally, the speed is lower for fans with a larger diameter. Purely by way of a non-limiting example, the rotational speed of the fan under constant-speed conditions may be less than 2500 rpm, for example less than 2300 rpm. Purely by way of a further non-limiting example, the rotational speed of the fan under constant-speed conditions for an engine having a fan diameter in the range of from 250 cm to 300 cm (for example 250 cm to 280 cm) may also be in the range of from 1700 rpm to 2500 rpm, for example in the range of from 1800 rpm to 2300 rpm, for example in the range of from 1900 rpm to 2100 rpm. Purely by way of a further non-limiting example, the speed of the fan under constant-speed conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

During the use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH of the flow. A fan tip loading may be defined as $dH/U_{tip}^2$, where dH is the enthalpy rise (for example the average 1-D enthalpy rise) across the fan and $U_{tip}$ is the (translational) speed of the fan tip, for example at the leading edge of the tip (which may be defined as fan tip radius at the leading edge multiplied by angular speed). The fan tip loading at constant-speed conditions may be more than (or of the order of magnitude of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core under constant-speed conditions. In the case of some arrangements, the bypass ratio can be more than (or of the order of magnitude of): 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of a non-limiting example, the overall pressure ratio of a gas turbine engine as described and/or claimed herein at constant speed may be greater than (or of the order of magnitude of): 35, 40, 45, 50, 55, 60, 65, 70, 75. The overall pressure ratio may be in an inclusive range bounded by any two of the values in the previous sentence (i.e. the values may form upper or lower bounds).

The specific thrust of an engine can be defined as the net thrust of the engine divided by the total mass flow through the engine. The specific thrust of an engine as described and/or claimed herein at constant-speed conditions may be less than (or of the order of magnitude of): 110 Nkg$^{-1}$ s, 105 Nkg$^{-1}$ s, 100 Nkg$^{-1}$ s, 95 Nkg$^{-1}$ s, 90 Nkg$^{-1}$ s, 85 Nkg$^{-1}$ s or 80 Nkg$^{-1}$ s. The specific thrust may be in an inclusive range bounded by any two of the values in the previous sentence (i.e. the values may form upper or lower bounds). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of magnitude of): 160 kN, 170 kN, 180 kN, 190 kN, 200 kN, 250 kN, 300 kN, 350 kN, 400 kN, 450 kN, 500 kN or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high-pressure turbine can be particularly high. This temperature, which may be referred to as TET, may be measured at the exit to the combustor, for example immediately upstream of the first turbine blade, which itself may be referred to as a nozzle guide blade. At constant speed, the TET can be at least (or of the order of magnitude of): 1400 K, 1450 K, 1500 K, 1550 K, 1600 K or 1650 K. The TET at constant speed may be in an inclusive range bounded by any two of the values in the previous sentence (i.e. the values may form upper or lower bounds). The maximum TET in the use of the engine can be at least (or of the order of magnitude of), for example: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, under a high thrust condition, for example under a maximum take-off thrust (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fiber. By way of a further example at least a part of the fan blade and/or aerofoil may be manufactured at least in part from a metal, such as a titanium based metal or an aluminum based material (such as an aluminum-lithium alloy) or a steel based material. The fan blade may comprise at least two regions manufactured using different materials. For example, the fan blade may have a protective leading edge, which is manufactured using a material that is better able to resist impact (for example from birds, ice or other material) than the rest of the blade. Such a leading edge may, for example, be manufactured using titanium or a titanium-based alloy. Thus, the fan blade may have merely an example for a carbon-fiber-based or aluminum-based body (such as an aluminum-lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage with a corresponding slot in the hub (or disk). Purely by way of example, such a fixture may be in the form of a dovetail that may slot into and/or be brought into engagement with a corresponding slot in the hub/disk in order to fix the fan blade to the hub/disk. By way of a further example, the fan blades may be formed integrally with a central portion. Such an arrangement can be referred to as a blisk or a bling. Any suitable method can be used to manufacture such a blisk or such a bling. For example, at least a part of the fan blades may be machined from a block and/or at least part of the fan blades may be attached to the hub/disk by welding, such as linear friction welding.

The gas turbine engines described and/or claimed herein may or may not be provided with a variable area nozzle (VAN). Such a variable area nozzle may allow the exit area of the bypass duct to be varied in operation. The general principles of the present disclosure can apply to engines with or without a VAN.

The fan of a gas turbine as described and/or claimed herein may have any desired number of fan blades, for example 16, 18, 20, or 22 fan blades.

As used herein, constant-speed conditions may mean the constant-speed conditions of an aircraft to which the gas turbine engine is attached. Such constant-speed conditions can be conventionally defined as the conditions during the middle part of the flight, for example the conditions experienced by the aircraft and/or the engine between (in terms of time and/or distance) the end of the ascent and the start of the descent.

Purely by way of example, the forward speed under the constant-speed condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of magnitude of Mach 0.8, of the order of magnitude of Mach 0.85 or in the range of from 0.8 to 0.85. Any speed within these ranges may be the constant-speed condition. For some aircraft, the constant-speed condition may be outside these ranges, for example below Mach 0.7 or above Mach 0.9.

Purely by way of example, the constant-speed conditions may correspond to standard atmospheric conditions at an altitude that is in the range of from 10 000 m to 15 000 m, for example in the range of from 10 000 m to 12 000 m, for example in the range of from 10 400 m to 11 600 m (around 38 000 ft), for example in the range of from 10 500 m to 11 500 m, for example in the range of from 10 600 m to 11 400 m, for example in the range of from 10 700 m (around 35 000 ft) to 11 300 m, for example in the range of from 10 800 m to 11 200 m, for example in the range of from 10 900 m to 11 100 m, for example of the order of magnitude of 11 000 m. The constant-speed conditions may correspond to standard atmospheric conditions at any given altitude in these ranges.

Purely by way of example, the constant-speed conditions may correspond to the following: a forward Mach number of 0.8; a pressure of 23 000 Pa and a temperature of −55° C.

As used anywhere herein, "constant speed" or "constant-speed conditions" can mean the aerodynamic design point. Such an aerodynamic design point (or ADP) may correspond to the conditions (comprising, for example, the Mach Number, environmental conditions and thrust demand) for which the fan is designed to operate. This may mean, for example, the conditions at which the fan (or gas turbine engine) is designed to have optimum efficiency.

During operation, a gas turbine engine described and/or claimed herein may be operated under the constant-speed conditions defined elsewhere herein. Such constant-speed conditions may be determined by the constant-speed conditions (for example the conditions during the middle part of the flight) of an aircraft on which at least one (for example two or four) gas turbine engine(s) may be mounted in order to provide propulsive thrust.

It is self-evident to a person skilled in the art that a feature or parameter described in relation to any one of the above aspects may be applied to any other aspect, unless they are mutually exclusive. Furthermore, any feature or any parameter described here may be applied to any aspect and/or combined with any other feature or parameter described here, unless they are mutually exclusive.

Embodiments will now be described by way of example with reference to the figures, in which.

Figure 1:
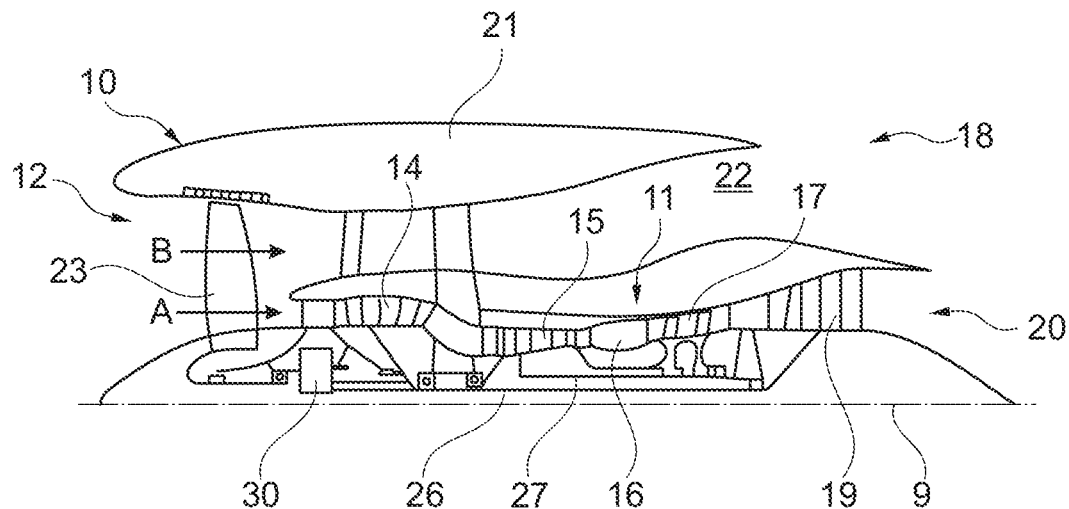
FIG. 1 shows a sectional lateral view of a gas turbine engine.

FIG. 1 illustrates a gas turbine engine 10 having a main axis of rotation 9. The gas turbine engine 10 comprises an air inlet 12 and a fan 23 that generates two air flows: a core air flow A and a bypass air flow B. The gas turbine engine 10 comprises a core 11 that receives the core air flow A. When viewed in the order corresponding to the axial direction of flow, the core engine 11 comprises a low-pressure compressor 14, a high-pressure compressor 15, a combustion device 16, a high-pressure turbine 17, a low-pressure turbine 19 and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 via a shaft 26 and an epicyclic planetary transmission 30.

During operation, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resultant hot combustion products then expand through, and thereby drive, the high-pressure and low-pressure turbines 17, 19 before being expelled through the nozzle 20 to provide some propulsive thrust. The high-pressure turbine 17 drives the high-pressure compressor 15 by means of a suitable connection shaft 27. The fan 23 generally provides the major part of the propulsive thrust. The epicyclic planetary transmission 30 is a reduction transmission.

Figure 2:
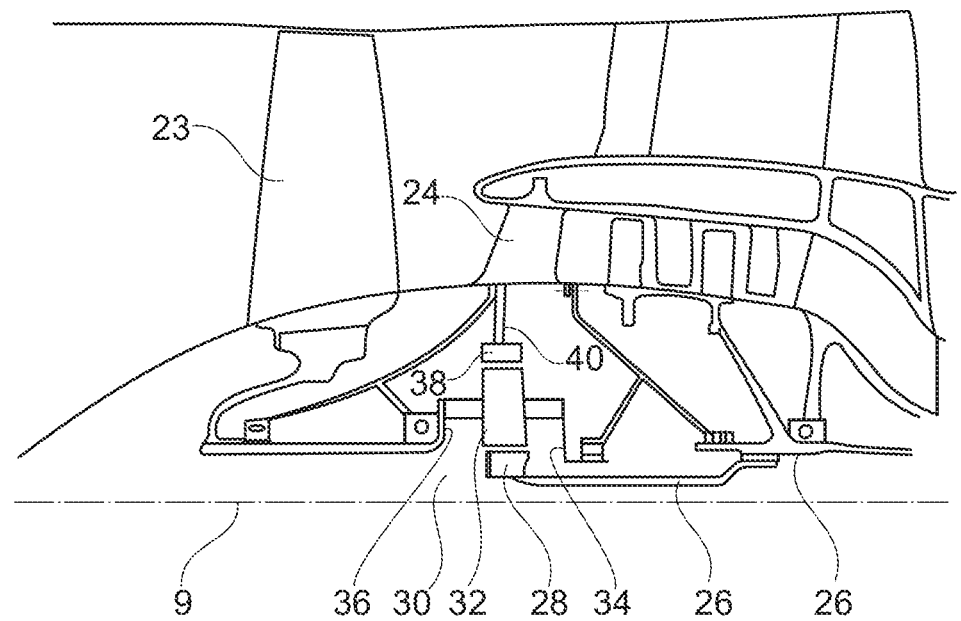
FIG. 2 shows a close-up sectional lateral view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic planetary transmission 30. Radially to the outside of the sun gear 28 and meshing therewith are a plurality of planet gears 32 that are coupled to one another by a planet carrier 34. The planet carrier 34 guides the planet gears 32 in such a way that they circulate synchronously around the sun gear 28, whilst enabling each planet gear 32 to rotate about its own axis. The planet carrier 34 is coupled via linkages 36 to the fan 23 in order to drive its rotation about the engine axis 9. Radially to the outside of the planet gears 32 and meshing therewith is an annulus or ring gear 38 that is coupled, via linkages 40, to a stationary supporting structure 24.

Note that the terms "low-pressure turbine" and "low-pressure compressor" as used herein may be taken to mean the lowest-pressure turbine stage and lowest-pressure compressor stage (i.e. not including the fan 23) respectively and/or the turbine and compressor stages that are connected together by the connecting shaft 26 with the lowest rotational speed in the engine (i.e. not including the transmission output shaft that drives the fan 23). In some literature, the "low-pressure turbine" and "low-pressure compressor" referred to herein may alternatively be known as the "intermediate-pressure turbine" and "intermediate-pressure compressor". Where such alternative nomenclature is used, the fan 23 may be referred to as a first, or lowest-pressure, compression stage.

Figure 3:
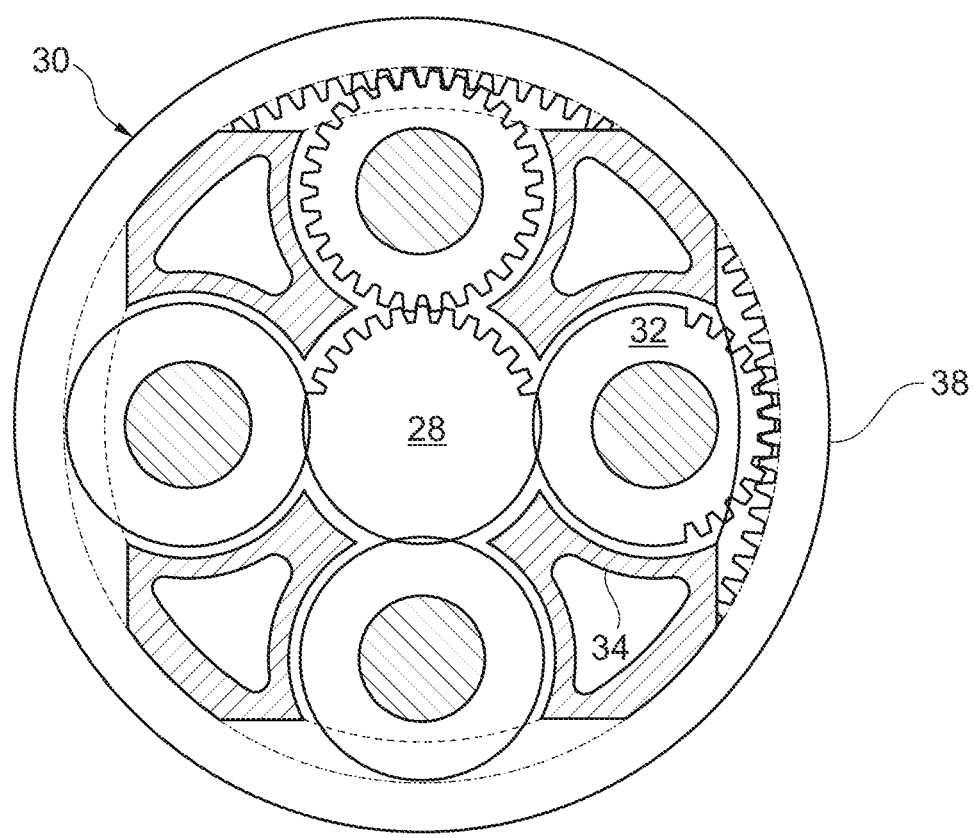
FIG. 3 shows a partially cut-away view of a transmission for a gas turbine engine.

The epicyclic planetary transmission 30 is shown by way of example in greater detail in FIG. 3. Each of the sun gear 28, planet gears 32 and ring gear 38 comprise teeth on their periphery to allow intermeshing with the other gearwheels. However, for clarity, only exemplary portions of the teeth are illustrated in FIG. 3. There are four planet gears 32 illustrated, although it will be apparent to the person skilled in the art that more or fewer planet gears 32 may be provided within the scope of protection of the claimed invention. Practical applications of an epicyclic planetary gearbox 30 generally comprise at least three planet gears 32.

The epicyclic planetary transmission 30 illustrated by way of example in FIGS. 2 and 3 is a planetary transmission in which the planet carrier 34 is coupled to an output shaft via linkages 36, with the ring gear 38 being fixed. However, any other suitable type of planetary transmission 30 may be used. By way of a further example, the planetary transmission 30 may be a star arrangement, in which the planet carrier 34 is held fixed, with the ring gear (or annulus) 38 allowed to rotate. In such an arrangement, the fan 23 is driven by the ring gear 38. By way of a further alternative example, the transmission 30 may be a differential transmission in which the ring gear 38 and the planet carrier 34 are both allowed to rotate.

It is self-evident that the arrangement shown in FIGS. 2 and 3 is merely an example, and various alternatives fall within the scope of protection of the present disclosure. Purely by way of example, any suitable arrangement may be used for locating the transmission 30 in the gas turbine engine 10 and/or for connecting the transmission 30 to the gas turbine engine 10. By way of a further example, the connections (such as the linkages 36, 40 in the example of FIG. 2) between the transmission 30 and other parts of the gas turbine engine 10 (such as e.g. the input shaft 26, the output shaft and the fixed structure 24) may have a certain degree of stiffness or flexibility. By way of a further example, any suitable arrangement of the bearings between rotating and stationary parts of the gas turbine engine 10 (for example between the input and output shafts of the transmission and the fixed structures, such as the transmission casing) may be used, and the disclosure is not limited to the exemplary arrangement of FIG. 2. For example, where the gearbox 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having any arrangement of transmission types (for example star or epicyclic-planetary), support structures, input and output shaft arrangement, and bearing locations.

Optionally, the transmission may drive additional and/or alternative components (e.g. the intermediate-pressure compressor and/or a booster compressor).

Other gas turbine engines to which the present disclosure can be applied may have alternative configurations. For example, engines of this type may have an alternative number of compressors and/or turbines and/or an alternative number of connecting shafts. By way of a further example, the gas turbine engine shown in FIG. 1 has a split flow nozzle 20, 22, which means that the flow through the bypass duct 22 has its own nozzle that is separate from and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed flow or split flow) may have a fixed or variable area. Whilst the described example relates to a turbofan engine, the disclosure may be applied, for example, to any type of gas turbine engine, such as an open-rotor (in which the fan stage is not surrounded by a nacelle) or turboprop engine, for example. In some arrangements, the gas turbine engine 10 may not comprise a transmission 30.

The geometry of the gas turbine engine 10, and components thereof, is/are defined by a conventional axis system, comprising an axial direction (which is aligned with the axis of rotation 9), a radial direction (in the bottom-to-top direction in FIG. 1), and a circumferential direction (perpendicular to the view in FIG. 1). The axial, radial and circumferential directions are mutually perpendicular.

Typically, in a turbomachine, labyrinth seals are used for example as seals between individual stages of a turbine 17, 19 or individual stages of a compressor 14, 15. Thus, for example by means of corresponding labyrinth seals, hot gases are prevented from ingressing into the region of the rotor disks of a turbine 17, 19. Labyrinth seals are also used to be able to apply different pressures in targeted fashion to a region.

Figure 4:
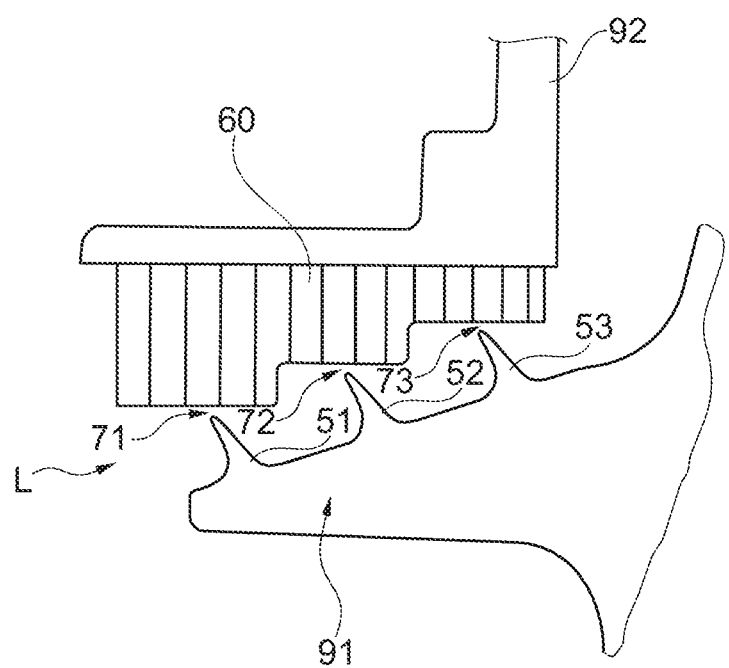
FIG. 4 shows a schematic sectional view through a known labyrinth seal system.

FIG. 4 illustrates an embodiment for a known labyrinth seal system.

Here, three sealing fins 51, 52, 53 are arranged radially at the outside on a rotor 91 of a turbine stage. Here, the sealing fins 51, 52, 53 are arranged axially one behind the other. The expression "axial" relates here to the axis of rotation 9 (not illustrated in FIG. 4). Here, the sealing fins 51, 52, 53 are arranged axially one behind the other even if the three sealing fins are in this case also radially offset.

Such a labyrinth seal system may basically also be used on other rotating components of a turbomachine 10.

The sealing fins 51, 52, 53 engage into the radially facing run-in element 60, which is arranged in encircling fashion on a stator 92. The run-in element 60 may for example have a honeycomb structure. The run-in element 60 is in this case of stepped form, wherein the stepping corresponds to the radial offset of the sealing fins 51, 52, 53.

It is alternatively also possible for the run-in element 60 to have a planar surface facing the sealing fins 51, 52, 53 if these have no radial offset.

The sealing fins 51, 52, 53 are basically produced and configured so as to have a particular radius around the axis of rotation 9 of the turbomachine 10. Here, it is also possible for two or even more than three sealing fins 51, 52, 53 to be used.

In the illustrated embodiment, by means of the stepped design of the run-in element 60 and by means of the arrangement of multiple sealing fins 51, 52, 53, a labyrinth seal system is created, wherein, between the run-in element 60 and the sealing fins 51, 52, 53, there are in each case radial sealing gaps 71, 72, 73 through which a part of the air flow L can flow. The air flow L flows substantially in an axial direction.

As the sealing fins 51, 52, 53 run into the run-in element 60, intense thermal loading of the sealing fins 51, 52, 53 arises. Here, cracks may occur in the sealing fins 51, 52, 53.

Figure 5:
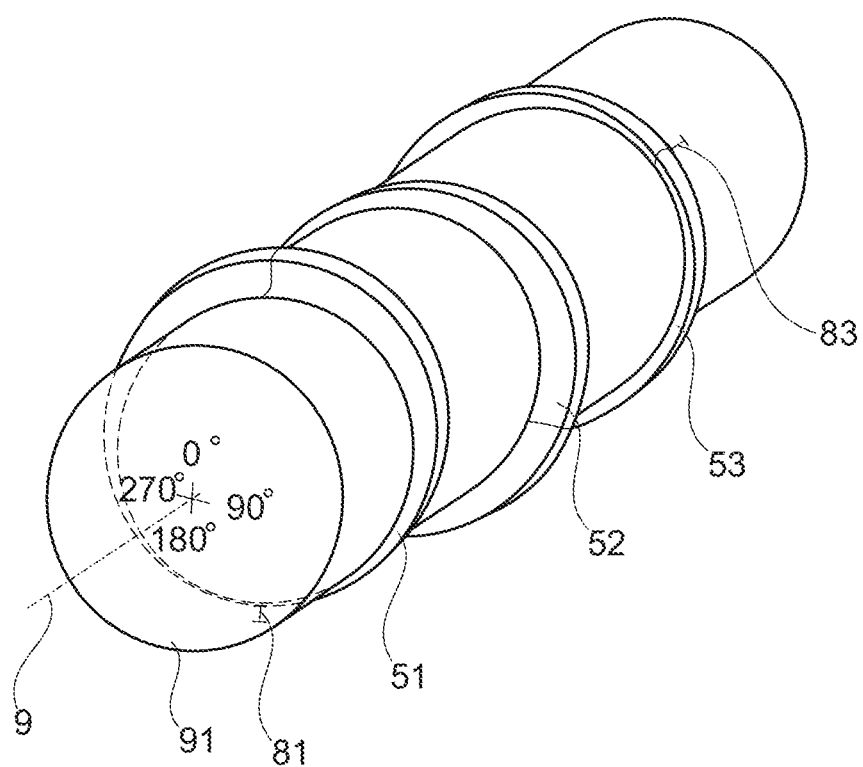
FIG. 5 shows a schematic perspective illustration of sealing fins, which are offset eccentrically in a circumferential direction, on a rotor.

FIG. 5 schematically illustrates, in a perspective view, a part of a labyrinth seal system, specifically the rotor 91 with sealing fins 51, 52, 53 arranged on the circumference. The stator 92, surrounding the rotor 91, with the run-in element 60 is not illustrated here for the sake of clarity.

By means of a particular arrangement of the sealing fins 51, 52, 53, the thermal load on the sealing fins 51, 52, 53 is lowered in targeted fashion by virtue of an air flow for cooling the sealing fins 51, 52, 53 being provided in targeted fashion over the entire length of the seal, that is to say from the—in the flow direction L—first sealing fin 51 to the final, third sealing fin 53. An air flow to the sealing fins 51, 52, 53 is thus made possible.

This is achieved by virtue of the sealing fins 51, 52, 53 being arranged with a circular circumference in each case eccentrically mutually offset on the circumference of the rotor 91.

By means of this eccentric offset (see also FIG. 6) of the sealing fins 51, 52, 53, the radially surrounding sealing gaps 71, 72, 73 have different heights.

In the embodiment illustrated, the sealing fins 51, 52, 53 are in each case eccentrically offset by 120°. FIG. 5 shows a coordinate system with which the angular positions of the eccentric offset can be specified.

The first sealing fin 51 has been shifted upward by the eccentricity e (see FIG. 6), that is to say in the direction of the run-in element 60 at the 0° position (see coordinate system shown). The first sealing fin 51 has its maximum radial extent at 0°.

The second sealing fin 52 has been shifted radially by the same magnitude of the eccentricity e in the direction of the run-in element 60 at 120°. The second sealing fin 52 has its maximum radial extent at 120°.

The third sealing fin 53 has been shifted radially by the same magnitude of the eccentricity e in the direction of the run-in element 60 at 240°. The third sealing fin 53 has its maximum radial extent at 240°.

The offset angle of the sealing fins 51, 52, 53 is thus 120°, corresponding to offset angle=360°/number of sealing fins 51, 52, 53.

The sealing gaps 71, 72, 73 thus have corresponding maxima and minima. In FIG. 5, owing to the fact that the run-in element 60 is not illustrated, the sealing gaps 71, 72, 73 can be illustrated only schematically, that is to say as space situated radially to the outside of the sealing fins 51, 52, 53.

The first sealing gap 71 between the first sealing fin 51 and the run-in element 60 has a minimum at 0°, because the eccentric offset e in the direction of the run-in element 60 is present there. Consequently, the first sealing gap 71 has a maximum 81 at the 180° position, that is to say opposite the 0° position.

The second sealing gap 72 between the second sealing fin 52 and the run-in element 60 has a minimum at 120°, because the eccentric offset e in the direction of the run-in element 60 has been realized there. Consequently, the second sealing gap 72 has a maximum 82 at the 300° position, that is to say opposite the 120° position.

The third sealing gap 73 between the third sealing fin 53 and the run-in element 60 has a minimum at 270°, because the eccentric offset e in the direction of the run-in element 60 has been realized there. Consequently, the third sealing gap 73 has a maximum 83 at the 60° position, that is to say opposite the 240° position.

The maxima 81, 82, 83 of the radial sealing gaps 71, 72, 73 are thus arranged offset with respect to one another in a circumferential direction. The air L can thus always flow through a passage at one of the maxima 81, 82, 83 of the sealing gaps 71, 72, 73. As a result of the convective cooling over the entire length of the labyrinth seal system, excessive thermal loading of the sealing fins 51, 52, 53 in the event of rubbing against the stator is prevented.

In an embodiment with only two sealing fins 51, 52, the eccentric offset e would be arranged at 0° and 180°.

In an embodiment with four sealing fins the eccentric offset e would be arranged at 0°, 90°, 180° and 270°.

In each case, such a rotationally symmetrical arrangement means that it is never the case that two or more of the sealing fins 51, 52, 53 make contact with the circumference at the same angular position.

Figure 6:
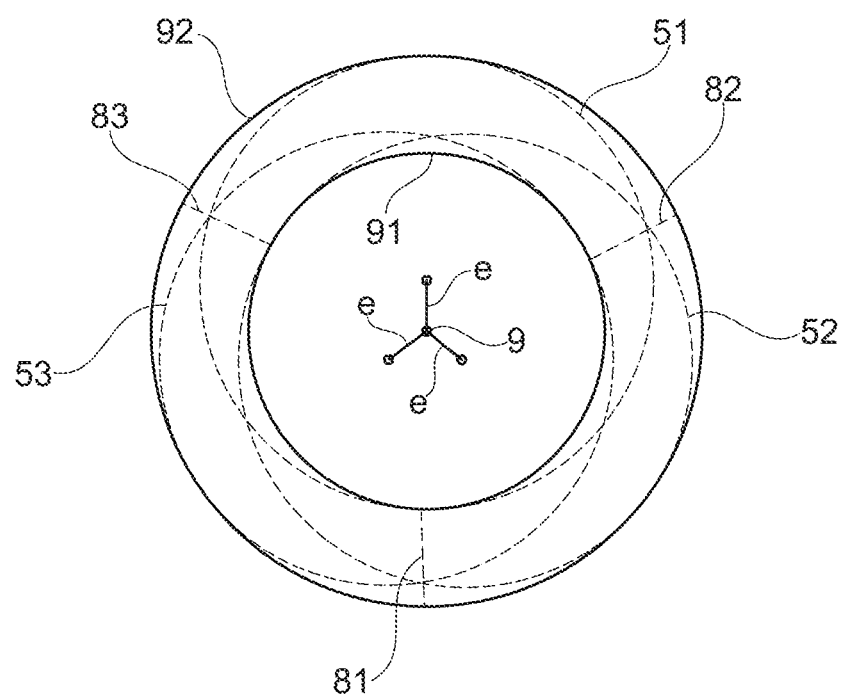
FIG. 6 shows a schematic illustration, in an axial direction, of eccentrically offset sealing fins.

FIG. 6 illustrates the rotor 91 with the three eccentrically arranged sealing fins 51, 52, 53 in a front view, that is to say perpendicular to the axis of rotation 9. The eccentricity e is illustrated here on a very greatly exaggerated scale. A typical value for the eccentricity e is 0.1 mm, which is much smaller in relation to a typical sealing ring diameter (100 to 600 mm). The eccentric offset e may however be oriented to the typical values for rotor eccentricities in the region of the labyrinth seals in order to prevent an excessive loss of sealing action.

It can however be clearly seen in this view that there are targeted regions which permit a passage for the air flow L. These regions lie around the maxima 81, 82, 83 of the sealing gaps 71, 72, 73, that is to say at 180°, 300° and 60°.

In the embodiment illustrated here, eccentricities e have been generated in targeted fashion by means of the offset of sealing fins 51, 52, 53, such that the sealing gaps 71, 72, 73 have maxima 81, 82, 83.

In an alternative embodiment, said maxima 81, 82, 83 of the sealing gaps 71, 72, 73 have been generated not through variation of the radial extent of the sealing fins 51, 52, 53 but rather through a variation of the radial extent in the run-in element 60. It is thus possible for the minima of the radial extent of the run-in element 60 to be arranged offset with respect to one another in a circumferential direction, analogously to FIG. 6. If the sealing fins 51, 52, 53 all have the same diameter and are arranged concentrically around the rotor 91, the variation of the height of the sealing gaps 71, 72, 73 arises exclusively owing to the eccentric offset in the run-in element 60.

Here, it is basically also possible for relatively complex modulations of the sealing gaps 71, 72, 73 to be attained by implementing an eccentric offset e of the sealing fins 51, 52, 53 and an eccentric offset in the run-in regions in the run-in element 60.

In the embodiment as per FIGS. 5 and 6, the offset of the eccentricity e is arranged in each case rotationally symmetrically around the axis of rotation 9. In alternative embodiments, this may be deviated from. By means of an asymmetrical arrangement of the offset, an adaptation to the vibration characteristics of the rotor 91 can be realized.

Figure 7:
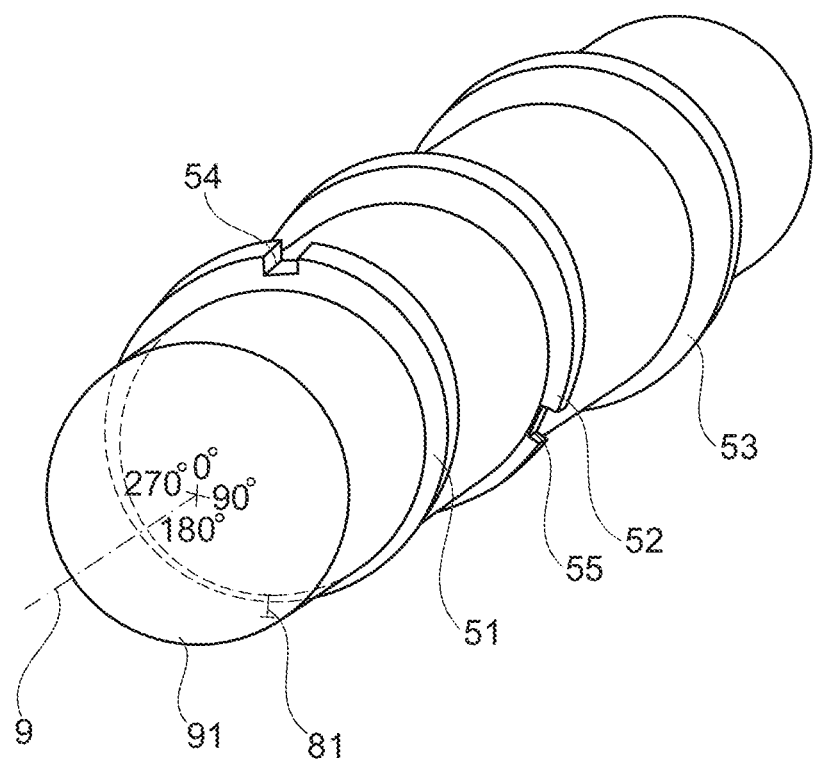
FIG. 7 shows a schematic, perspective illustration of a rotor with sealing fins which have recesses offset on the circumference.

As stated in conjunction with FIGS. 5 and 6, the targeted arrangement of maxima in the sealing gap height is of importance. Said maxima 81, 82, 83 may also be generated in the case of sealing fins 51, 52, 53 arranged concentrically around the rotor 91, as illustrated by way of example in the embodiment as per FIG. 7.

On the circumference of the sealing fins 51, 52, 53, there are arranged recesses 54, 55 which are offset rotationally symmetrically by 120°, wherein the recess on the third sealing fin 53 is not visible here.

The recesses 54, 55 likewise give rise to maxima 81, 82, 83 of the radial sealing gaps 71, 72, 73, which maxima are arranged offset with respect to one another in a circumferential direction, such that, in the region of the maxima 81, 82, 83, a passage exists in targeted fashion, for an air flow L to the sealing fins 51, 52, 53, in the event of rubbing against the stator.

It is self-evident that the invention is not restricted to the embodiments described above and that various modifications and improvements may be made without departing from the concepts described here. Any of the features may be used separately or in combination with any other features, unless they are mutually exclusive, and the disclosure extends to and includes all combinations and subcombinations of one or more features which are described here.

LIST OF REFERENCE DESIGNATIONS

9 Main axis of rotation
10 Gas turbine engine, turbomachine
11 Core engine
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Fan
24 Fixed supporting structure
26 Shaft
27 Connecting shaft
28 Sun gear
30 Transmission
32 Planet gears
34 Planet carrier
36 Linkage
38 Ring gear
40 Linkage
51 First sealing fin
52 Second sealing fin
53 Third sealing fin
54 First recess
55 Second recess
60 Run-in element 71 First radial sealing gap
72 Second radial sealing gap
73 Third radial sealing gap
81 First maximum in the radial sealing gap
82 Second maximum in the radial sealing gap
83 Third maximum in the radial sealing gap
91 Rotor
92 Stator
A Core air flow
B Bypass air flow
e Eccentricity, eccentric offset
L Air flow

The invention claimed is:

1. A labyrinth seal system comprising:
   at least two sealing fins arranged axially one behind the other on a rotor of a turbomachine,
   a radially facing run-in element for the two sealing fins on a stator of the turbomachine,
   wherein, for each of the at least two sealing fins, a radial sealing gap positioned between the run-in element and the at least two sealing fins,
   wherein maxima of the radial sealing gaps are arranged offset with respect to one another in a circumferential direction, such that, in a region of the maxima, a passage exists for an air flow to further sealing fins that follow downstream, upon rubbing of at least one of the at least two sealing fins against the stator,
   wherein the maxima are formed by an eccentric offset of the at least two sealing fins around the rotor.

2. The labyrinth seal system according to claim 1, wherein minima of a radial extent of the at least two sealing fins are arranged offset with respect to one another in a circumferential direction.

3. The labyrinth seal system according to claim 1, wherein minima of a radial extent of the run-in element are arranged offset with respect to one another in a circumferential direction.

4. The labyrinth seal system according to claim 3, wherein run-in regions for the at least two sealing fins in the run-in element are arranged so as to be eccentrically radially offset with respect to one another in the stator.

5. The labyrinth seal system according to claim 1, wherein the maxima are offset in a circumferential direction by an angle of 360°/number of the at least two sealing fins, such that the maxima are arranged rotationally symmetrically.

6. The labyrinth seal system according to claim 1, wherein the at least two sealing fins are oriented radially outward from the rotor.

7. The labyrinth seal system according to claim 1, wherein the at least two sealing fins include two to four sealing fins arranged axially one behind another.

8. The labyrinth seal system according to claim 1, wherein a circumferential contour of the at least two sealing fins is circular.

9. The labyrinth seal system according to claim 1, wherein an eccentricity of the at least two sealing fins is between 0.01 and 1 mm.

10. The labyrinth seal system according to claim 1, wherein the at least two sealing fins have recesses offset on a circumference thereof, forming passages for the air flow to the further sealing fins.

11. A gas turbine engine for an aircraft, comprising:
    a core engine comprising a turbine, a compressor, and a core shaft connecting the turbine to the compressor;
    a fan, which is positioned upstream of the core engine, wherein the fan comprises a plurality of fan blades; and
    a transmission, driven by the core shaft, wherein the fan is driven by the transmission at a lower rotational speed than the core shaft,
    the labyrinth seal system according to claim 1.

12. The labyrinth seal system according to claim 1, wherein an eccentricity of the at least two sealing fins is between 0.05 and 0.15 mm.

13. The labyrinth seal system according to claim 1, wherein an eccentricity of the at least two sealing fins is 0.1 mm.

14. The labyrinth seal system according to claim 1, wherein an eccentricity of the at least two sealing fins is 0.1 mm for every 200 mm diameter of the rotor.

15. A labyrinth seal system comprising:
    at least two sealing fins arranged axially one behind the other on a rotor of a turbomachine,
    a radially facing run-in element for the two sealing fins on a stator of the turbomachine,
    wherein, for each of the at least two sealing fins, a radial sealing gap positioned between the run-in element and the at least two sealing fins,
    wherein maxima of the radial sealing gaps are arranged offset with respect to one another in a circumferential direction, such that, in a region of the maxima, a passage exists for an air flow to further sealing fins that follow downstream, upon rubbing of at least one of the at least two sealing fins against the stator,
    wherein minima of a radial extent of the run-in element are arranged offset with respect to one another in a circumferential direction,
    wherein run-in regions for the at least two sealing fins in the run-in element are arranged so as to be eccentrically radially offset with respect to one another in the stator.

16. A labyrinth seal system comprising:
    at least two sealing fins arranged axially one behind the other on a rotor of a turbomachine,
    a radially facing run-in element for the two sealing fins on a stator of the turbomachine,
    wherein, for each of the at least two sealing fins, a radial sealing gap positioned between the run-in element and the at least two sealing fins,
    wherein maxima of the radial sealing gaps are arranged offset with respect to one another in a circumferential direction, such that, in a region of the maxima, a passage exists for an air flow to further sealing fins that follow downstream, upon rubbing of at least one of the at least two sealing fins against the stator,
    wherein an eccentricity of the at least two sealing fins is between 0.01 and 1 mm.

17. The labyrinth seal system according to claim 16, wherein the eccentricity of the at least two sealing fins is between 0.05 and 0.15 mm.

18. The labyrinth seal system according to claim 16, wherein the eccentricity of the at least two sealing fins is 0.1 mm.

* * * * *